Reissued June 24, 1947

Re. 22,893

UNITED STATES PATENT OFFICE 22,893

MANUFACTURE OF AN IMPROVED VITREOUS MATERIAL

Albert William Henry Wedlock, Cirencester, England, assignor, by mesne assignments, to Mycalex Corporation of America, New York, N. Y., a corporation of New York No Drawing. Original No. 2,032,239, dated February 25, 1936, Serial No. 25,964, June 10, 1935.

Application for reissue May 4, 1944, Serial No. 534,178. In Great Britain October 26, 1933

4 Claims. (Cl. 106—39)

This invention relates to an improved vitreous material and a method of manufacturing the same, the object of the invention being to produce a vitreous material which apart from having high di-electric properties possesses in an unusual degree the quality of adhesion to metal, especially those metals that are largely used in the mechanical arts such as inter alia steel and cast iron, aluminium, bronze and gun metal. Moreover the material is capable of being moulded, pressed and rolled, and accordingly has the widest possible field of application for electrical, mechanical and physical apparatus.

Amongst the many applications to which the material lends itself is the manufacture of high pressure gas seals, for the leading-in insulators for high electric frequency mercury converters and allied purposes wherein high quality insulation and fluid tightness is possible between a central metal electrode, the vitreous material itself and an outer retaining metal part.

According to the invention an improved vitreous material capable of adhesion to metallic surfaces is provided consisting of an admixture of mica and/or asbestos with dried and finely ground ceramic materials including a proportion of cryolite and alkaline carbonates.

The invention also consists in a method of manufacturing an improved vitreous material capable of adhesion to metallic surfaces comprising the step of admixing mica and/or asbestos with dried and finely ground ceramic materials including a proportion of cryolite and alkaline carbonates.

The preferred manner of practicing the invention utilizes ceramic materials which consist of the following ingredients, the proportions thereof being by weight:

| | Per cent |
|---|---|
| Cryolite ($3NaF,AlF_3$) | 20 |
| Barium carbonate ($BaCO_3$) | 10 |
| Potassium carbonate ($K_2CO_3$) | 13 |
| Soda ash ($Na_2CO_3$) | 9 |
| Boric acid ($H_3BO_3$) | 48 |

These materials are ground to a fine powder and then carefully admixed and then passed through a drying furnace at 500° C. until the moisture of crystallization has been driven off, without producing fusion or vitrification leaving a white glass frit with a gravity loss of approximately 35%. The frit, thus produced is then ground to a fine powder to pass 120 x 120 mesh per square inch.

This forms a partial reaction product containin $B_2O_3$ (boron oxide) combined with the oxides and fluorides of the metals involved in the reaction. The partial reaction product is now in condition for incorporation with the other constituents of the final composition.

The mica product is ground to an equal fineness and then 40% by weight of frit is added to 60% by weight of mica the whole being compounded in a mixing machine, 8% of water being added to the mixture as a spray or mist.

The damped admixture is then subjected to cold pressing, the moisture present being just sufficient to cause a binding without adhesion to the mold, and if the mica prior to mixing be not sufficiently dry a slightly less addition of water is employed. In this connection it is preferable not to dry the mica or asbestos unless under temperature control to avoid crystal degradation. As micas vary in this respect, the point of breakdown should be found empirically and the furnace drying levels set below this figure. The pressure employed is approximately 1½ tons per square inch and this pressure is maintained for at least ten minutes. The billets produced from pressing require no intermediate drying, but are inserted as blocks, scales or thick plates into the furnace within which they are progressively heated to 620° C. or thereabouts, the period of heat soak depending upon the thickness of the billet used, and the heat level being such that plasticity shall have set in. The material from the furnace is then used for molding, the parts or molds to receive the material being treated and the material fed from the furnace to the press, with the least possible delay. Pressings should remain in the mold under pressure, as the material in cooling tends to swell, this feature enabling a hermetic seal to be produced between metal parts and the material itself.

The property of metallic adhesion of the finished material even when made in slabs or blocks is very pronounced. Thus a block of finished material made according to this invention may have a layer of metal such as aluminum cast upon its surface, and the metal and materials upon cooling are inseparable and can be tooled, sawn or otherwise worked together without the one material becoming detached from the other.

The di-electric properties of the vitreous material hereunder produced are good, and it also possesses in high degree resistance to shock; to a limited extent it will bend without crazing or cracking.

While there has been set forth above a single specific embodiment of the invention together with the details of proportions of constituents, temperatures used, and various other factors, the above example is intended to be illustrative of the nature of the present invention and should not be considered as limiting the same. The invention is to be broadly construed and not to be limited except by the character of the claims appended hereto.

What is claimed is:

1. An insulating material consisting of a mixture of mica with a frit which is a product resulting from heating a mixture of finely powdered boric acid and alkaline carbonates to a sufficiently high temperature to drive off the water of crystallization to produce a frit, said heated mixture containing cryolite.

2. A method of making molded compositions which consists in providing a mixture of mica with a frit which is a product resulting from heating a mixture of finely powdered boric acid and alkaline carbonates to a sufficiently high temperature to drive off the water of crystallization to produce a frit, said heated mixture containing cryolite, subjecting the same to a temperature at which plasticity sets in, placing the same in a mold, and pressing said mixture.

3. A method of making molded compositions which consists in providing a mixture of mica with a frit which is a product resulting from heating a mixture of finely powdered boric acid and alkaline carbonates to a sufficiently high temperature to drive off the water of crystallization to produce a frit, said heated mixture containing cryolite, subjecting the same to a temperature at which plasticity sets in, placing the same in a mold, and pressing said mixture, and cooling said molded composition while maintaining pressure thereon.

4. A method of making molded compositions which consists in providing a mixture of mica with a frit which is a reaction product resulting from heating a mixture of finely powdered boric acid and alkaline carbonates with cryolite to a sufficiently high temperature to drive off the water of crystallization to produce a frit, heating the same to render said mixture plastic, then placing the same in a mold, subjecting the same to pressure to form said mixture into the desired shape, and cooling the same under pressure.

ALBERT WILLIAM HENRY WEDLOCK.

REFERENCES CITED

The following references are of record in the file of this patent:

UNITED STATES PATENTS

| Number | Name | Date |
|---|---|---|
| 2,136,877 | Delpech | Nov. 15, 1938 |
| 2,303,244 | Wedlock | Nov. 24, 1942 |
| Re. 15,727 | Crossley | Dec. 4, 1923 |
| 1,394,973 | Crossley | Oct. 25, 1921 |
| 1,795,200 | Crossley | Mar. 3, 1931 |
| 2,032,239 | Wedlock | Feb. 25, 1936 |

FOREIGN PATENTS

| Number | Country | Date |
|---|---|---|
| 113,397 | Australia | 1941 |

OTHER REFERENCES

Andrews: Enamels (1935), page 206.

Shaw: The Chemistry of Pottery (1900), page 470.